Fig 1.

Jan. 15, 1946. N. F. BARNES ET AL 2,393,013
SIGHTING APPARATUS FOR FIREARMS
Filed Dec. 6, 1943 11 Sheets-Sheet 3

Inventors
NORMAN F. BARNES,
KENNETH R. GEISER,

Jan. 15, 1946.  N. F. BARNES ET AL  2,393,013
SIGHTING APPARATUS FOR FIREARMS
Filed Dec. 6, 1943  11 Sheets-Sheet 9

Norman F. Barnes,
Kenneth R. Geiser,
By C. E. Herrstrom & H. E. Thibodeau
Attorneys Patented Jan. 15, 1946

2,393,013

UNITED STATES PATENT OFFICE 2,393,013

SIGHTING APPARATUS FOR FIREARMS

Norman Franklin Barnes and Kenneth Raymond Geiser, Schenectady, N. Y., assignors to General Electric Company, a corporation of New York Application December 6, 1943, Serial No. 513,128

13 Claims. (Cl. 88—24)

This invention relates to a sighting apparatus and particularly to a method and apparatus for aligning the sights of a firearm with respect to the axis of the firearm bore to insure correct alignment.

The alignment of the sights of firearms and particularly rifles has been heretofore accomplished generally by a cut and try method involving the repeated firing of the rifle from a fixed position and adjustment of the sights visually into alignment with the center of the groups of shots produced on a target. This procedure naturally involves considerable time and appreciable expenditure of ammunition. Furthermore, the results are none too accurate since they depend entirely upon eye accuracy of the particular operator. Such a method is quite fatiguing on the eyes of any operator and accordingly the alignments produced vary with the fatigue of the operator's eyes.

It has been found that the last few inches of the muzzle end of the bore of small bore rifles in general substantially determines the projectile trajectory. We make use of this fact to provide an improved method and apparatus for aligning the sights of a firearm with its bore axis or to accomplish the targeting of the firearm, as such procedure is commonly referred to.

A further object of this invention is to provide a method and apparatus to accomplish such targeting without firing any cartridges.

Another object of this invention is to provide a targeting method and apparatus wherein the operator accomplishes the targeting with the aid of an optical comparator producing greatly enlarged images of the sights and hence eliminating eye fatigue.

The specific nature of the invention as well as other objects and advantages thereof will clearly appear from a description of a preferred embodiment as shown in the accompanying drawings in which:

Fig. 3 is an enlarged detail view shown partly in longitudinal section of the sighting apparatus showing particularly the manner of mounting the movable base to the fixed base.

Figure 1:
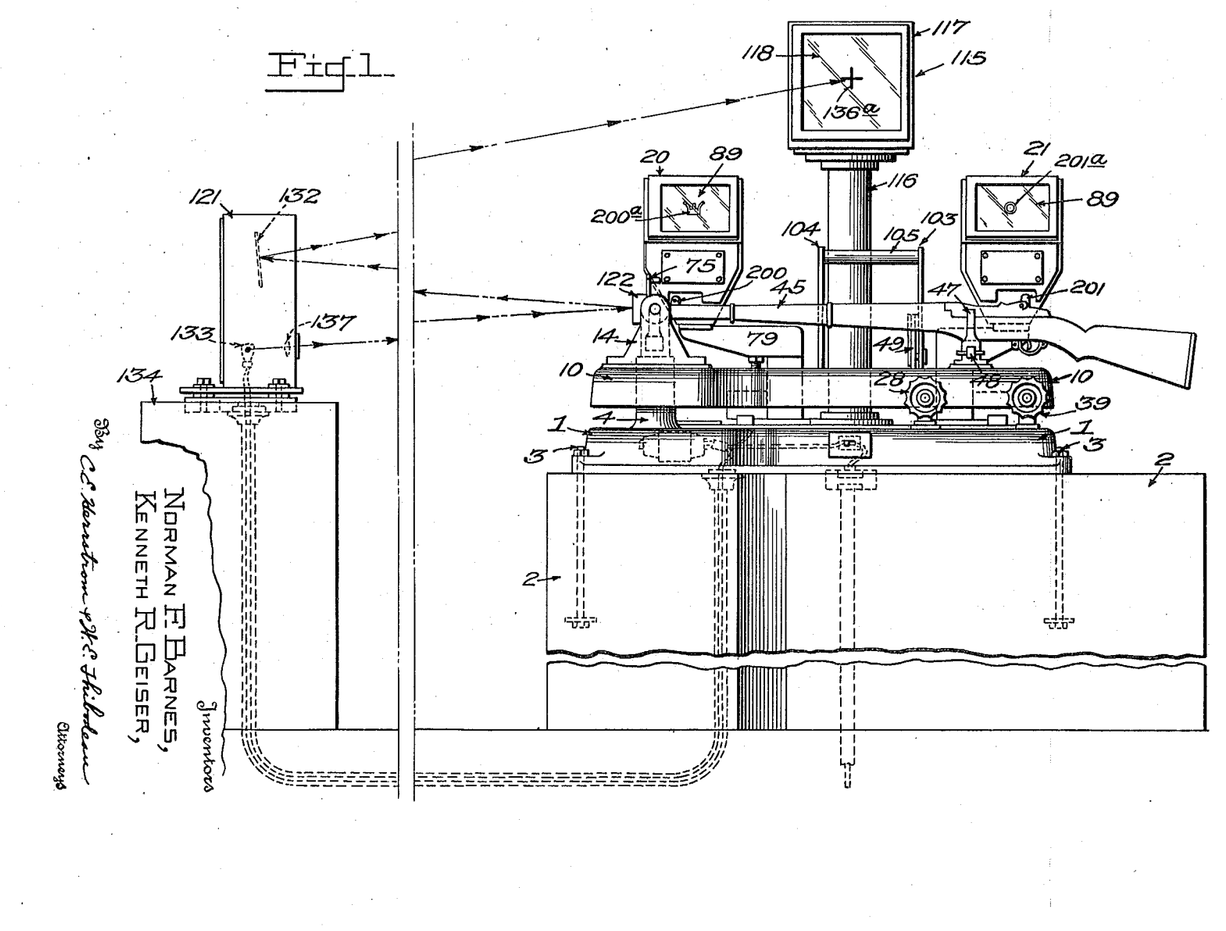
Fig. 1 is a front elevational view of the sighting apparatus shown mounted on a substantial base with a firearm positioned in the apparatus for alignment of the sights with respect to the bore. The operator works from the side from which this view is taken.
Figure 5:
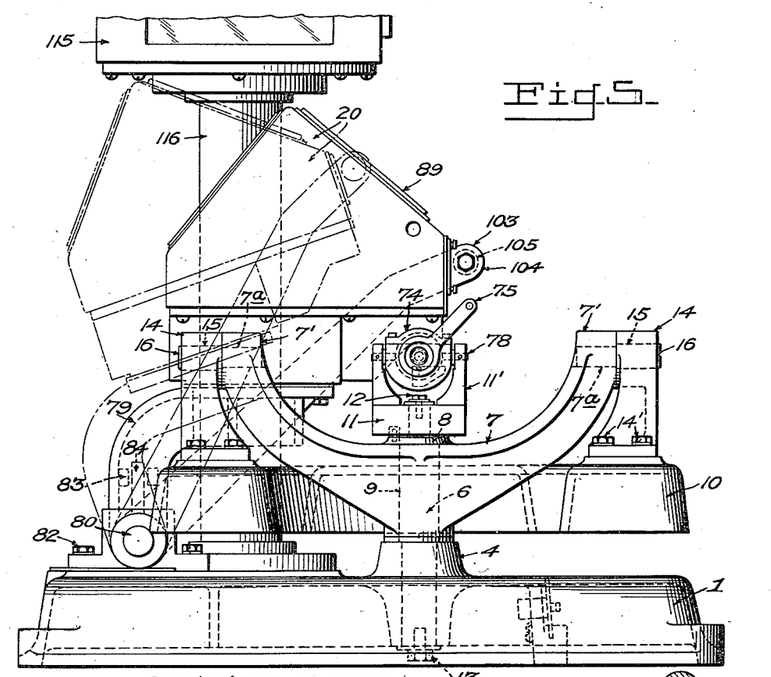
Fig. 5 is a left end elevational view of Figs. 3 and 4.

Referring to Fig. 1 there is shown in assembled relation an optical targeting apparatus for a firearm which comprises a fixed base 1, a movable base 10 and a pair of projectors 20 and 21 mounted on the fixed base 1. The base 1 is a cast member and is preferably mounted on a vibration-free poured concrete pier 2 and is secured thereto by four bolts 3. An integral boss 4 is centrally provided on the left end of base 1 as viewed in Fig. 1. This supports the front end of the upper adjustable base 10. An axial hole 5 (Fig. 3) is provided in boss 4 and a shaft 6 is inserted in an upright position in hole 5. A Y-shaped yoke 7 (see Fig. 5) provided with two upwardly projecting arms 7' has a small upstanding boss 8 centrally located between the arms 7'. An axial hole 9 is provided passing thru the yoke 7. The yoke 7 is thus mounted on a shaft 6 and supported on boss 4. A U-shaped gimbal 11 to be described in more detail later is mounted on the top of shaft 6 and is retained thereon by a bolt 12 screwed into a suitably threaded hole in the end of shaft 6. The other end of shaft 6 is retained within hole 5 by a bolt 13 and washer 13' screwed into a suitable hole in the bottom end of shaft 6.

On the upper surface of movable base 10 near the left end thereof as viewed in Fig. 1 there are mounted two brackets 14, one on each side of the base 10. Brackets 14 are secured to base 10 as by the screws 14'. A transverse horizontal hole 15 is provided in the top of each bracket 14 in which a pin 16 is inserted.

Figure 2:
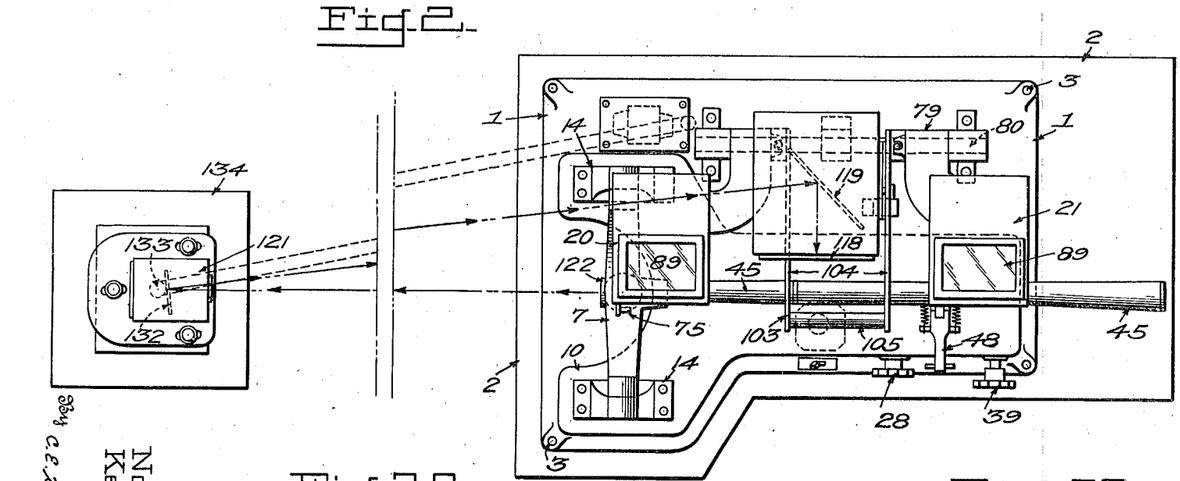
Fig. 2 is a top elevational view of Fig. 1.
Figure 4:
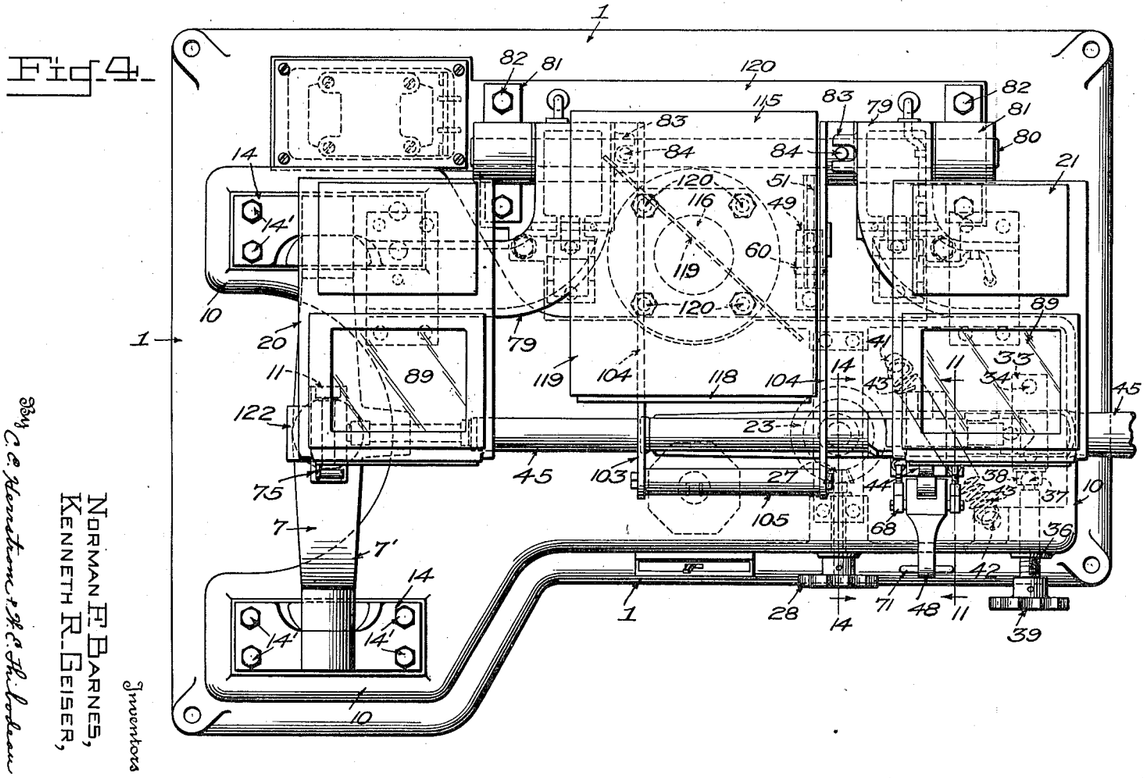
Fig. 4 is a top elevational view of Fig. 3.

The pins 16 project thru the brackets 14 and engage horizontal holes 7a in the arms 7' of the yoke 7, thereby pivotally supporting the base 10 on the yoke 7 as shown in Fig. 2.

Figure 14:
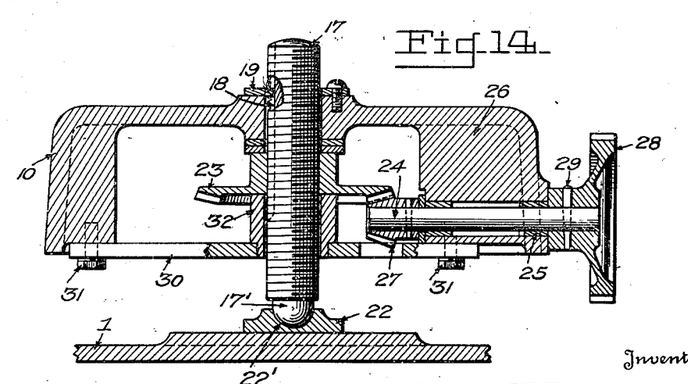
Fig. 14 is an enlarged detail view in cross section of the movable base elevating device.

The rear end of the upper base 10 is supported so as to be raised and lowered by the elevating arrangement shown in Fig. 14. An elevating bolt 17 is provided near the right end of base 10 and comprises a threaded vertical bolt having its bottom end 17' rounded. The elevating bolt 17 has on it a threaded nut 23, and the nut has a flanged gear cut in its outer periphery. The bolt is held from turning by a key which fits in keyway 18 and held in place by a retaining washer 19. The rounded end 17' of bolt 17 rests in a cup-shaped recess 22' of a shoe 22 which, in turn, has a sliding fit with and rests on top of base 1. The elevating nut 23 is arranged to be rotated by a handwheel 28 secured to the projecting end of a shaft 24 suitably supported in base 10 on the operator's side thereof. A bevel gear 27 on shaft 24 engages the bevel gear on the periphery of the elevating nut 23. To provide additional support for the bolt 17, a rectangular plate 30 is secured to the under side of base 10 by the bolts 31. A hollow boss 32 is provided in the center of the plate 30 which snugly surrounds bolt 17, thereby providing additional lateral support for such bolt. The ball bearing at 17' and the slidable shoe support 22 therefor allow for the tipping and lateral movements of the base 10 when the rear end is thus raised or is moved sidewise, as will be explained later, while the front end is cradled in yoke 7 and pivots about the vertical axis of such yoke.

Figures 6, 7:
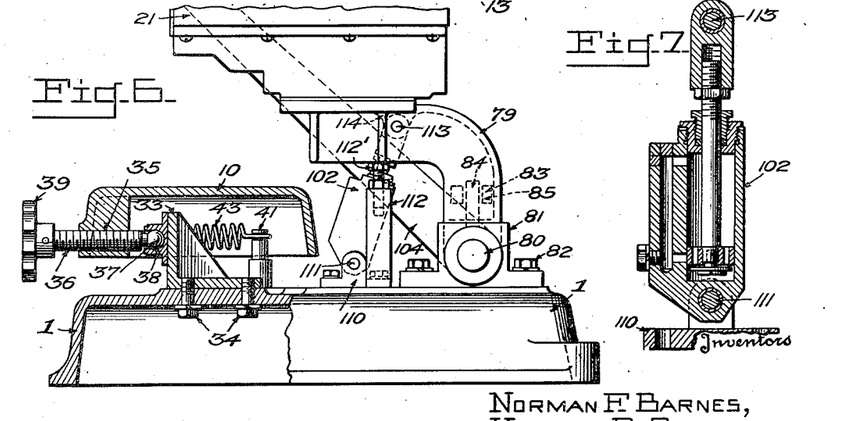
Fig. 6 is a detail view showing the method of mounting the projectors. There is also shown in cross section the screw arrangement utilized for windage adjustment of the movable base.
Fig. 7 is an enlarged detail view in longitudinal section of the dash pot used to ease lowering of the projector assemblies.

To provide for adjusting the rear end of 10 in a horizontal plane about the pivot a front end, the apparatus of Fig. 6 is provi which apparatus is located near the right-han end of base 1 as viewed in Figs. 1 and 3. A bracket 33 is secured to base 1 by bolts 34 as shown in Fig. 6. A threaded hole 35 is provided in the operator's side of movable base 10 directly opposite bracket 33. An azimuth adjusting screw 36 having a ball end 37 is screwed into hole 35 and bears against bracket 33 through the medium of shoe 38 having a recess for the reception of the ball end 37. The shoe 38 may slide on face 33 to allow for the vertical adjustment of base 10. A handwheel 39 is secured to a projecting end of screw 36. A spring 40 (Fig. 3) operating between a post 41 on base 1 and post 42 on movable base 10 provides a biasing force holding shoe 38 against the bracket 33 in all positions of movable base 10 with respect to base 1. Thus elevation and azimuth adjustment of the movable base 10 with respect to base 1 can be made by operation of handwheels 28 and 39 respectively.

Figure 11:
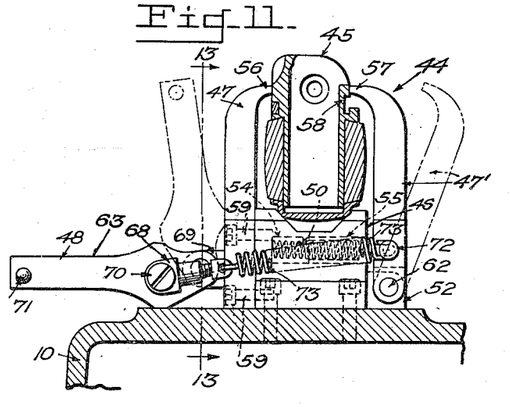
Fig. 11 is a detail view showing the clamping device utilized to support the rear end of the firearm.
Figure 12:
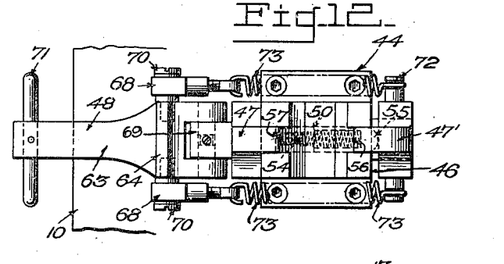
Fig. 12 is a top elevational view of Fig. 11.
Figure 13:
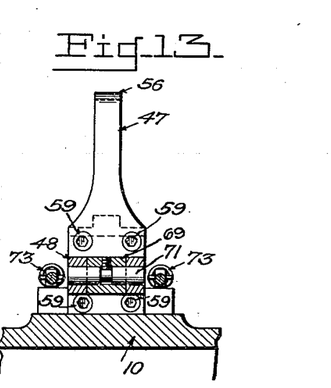
Fig. 13 is a cross sectional view taken along the plane 13—13 of Fig. 11.

On the top of base 10 in the center thereof and near the right end of base 10 as viewed in Figs. 1 and 3 there is provided a clamp 44 for holding the rear end of a firearm 45 (Figs. 11 and 13). Clamp 44 comprises a base portion 46 secured to movable base 10, two jaws 47 and 47' mounted thereon and a lever 48. The top surface of base portion 46 is shaped to engage the bottom of the central portion of a firearm 45. While this invention is applicable to any type firearm, the U. S. rifle caliber .30 M1 has been chosen as an example. The jaw 47 is fixedly mounted to the base portion 46 as by screws 59. Jaw 47' is pivotally secured to base portion 46 by a pin 62. The jaw 47' is biased away from body portion 46 by a spring 54 and a plunger 55 mounted in a recess 50 in body portion 46.

The upper ends of jaws 47 and 47' are bent towards each other to form fingers 56 and 57 which are arranged to engage suitable metallic surfaces on the receiver 58 of the firearm 45. The jaw 47' is pivoted into engagement with receiver 58 and holds the receiver firmly between itself and fixed jaw 47 by means of the lever 48. The lever 48 comprises an arm 63 and an enlarged end portion 64. The bottom of end portion 64 is slotted so that lever 48 may be pivotally mounted on a lug 69 on jaw 47 by a pin 71. A stud 70 is provided in lever 48 projecting from both sides thereof and a similar stud 72 is provided on movable jaw 47'. A pair of tension springs 73 is connected between studs 70 and 72, being looped about stud 72 and connected to stud 70 thru the medium of swivel hooks 68. The stud 70 is located behind the pivot point of lever 48 and hence lever 48 operates as a two position snap lever stopping against base 10 when lowered. Thus when lever 48 is lowered to a position as shown in Fig. 11, the bias of plunger 55 will be overcome and jaw 47' will bear firmly against the receiver 58 of firearm 45. With lever 48 raised to the upright position, stopping against fixed jaw 47, as shown in Fig. 11 in dotted outline the tension of springs 73 will then be reduced and the bias of plunger 55 will force jaw 47' away from firearm 45, permitting it to be readily removed.

Figure 8:
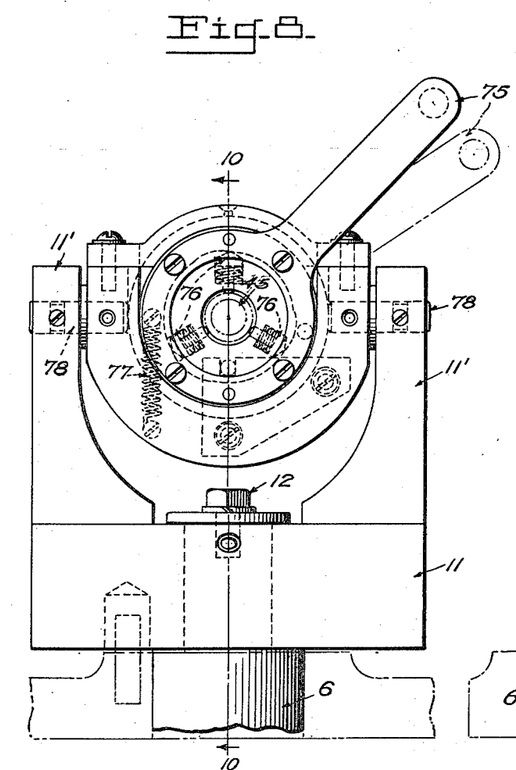
Fig. 8 is an enlarged front detail view showing the barrel chuck and gimbal used for supporting the muzzle end of a firearm.
Figure 9:
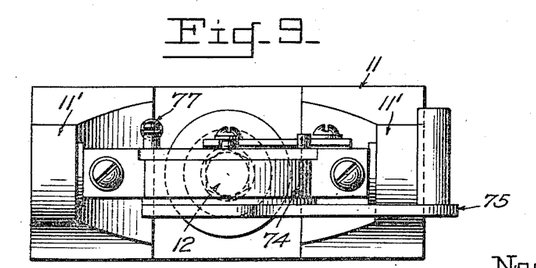
Fig. 9 is a top elevational view of Fig. 8.
Figure 10:
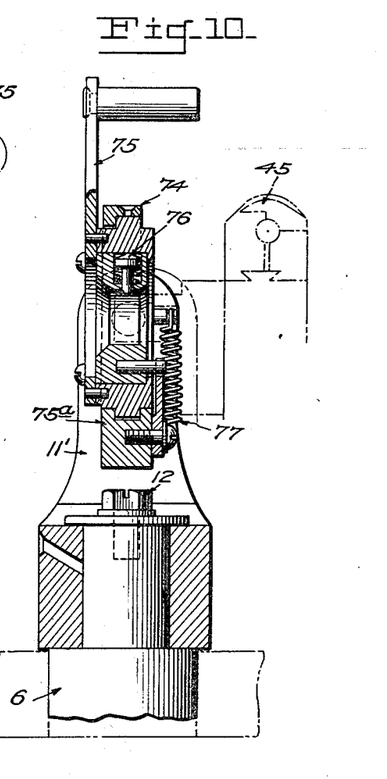
Fig. 10 is a longitudinal sectional view taken along the plane 10—10 of Fig. 8.

The gimbal 11 (Figs. 8, 9, 10) for holding the front end of the firearm as previously mentioned is a U-shaped member. The arms 11' of the U-shaped gimbal 11 pivotally support a firearm barrel chuck 74 on the pair of projecting studs 78. Chuck 74 is a spring operated chuck which is actuated by a lever 75. Three equally spaced spring biased plungers 76 are provided about the periphery of the interior of a chuck 74 and protrude inwardly to bear against the barrel of firearm 45 when the barrel is inserted within chuck 74. The lever 75 is secured to an annular body portion 75a surrounding the plungers 76. The interior surface of annular body portion 75a is shaped to cam plungers 76 inwardly when lever 75 is pivoted from right to left as viewed in Fig. 8. A spring 77 suitably secured between body portion 75a of lever 75 and chuck 74 is provided to maintain lever 75 in an upright position to continuously maintain sufficient pressure on plungers 76 to firmly hold the barrel of firearm 45 properly located within chuck 74. When lever 75 is moved to the right the plungers 76 are spring biased outwardly thereby permitting easy removal of the firearm barrel from chuck 74.

A pair of projectors 20 and 21 are mounted opposite the front and rear sights respectively of the firearm 45 on brackets 79. The front sight is indicated at 200 and the rear sight at 201 (Fig. 3). The projectors 20 and 21 are so mounted on the opposite side of the base 1 from which the operator stands that they may be moved from a testing position over the firearm, as shown in full lines in Fig. 5, upwardly to the rear, as shown in dotted lines in Fig. 5, to enable the firearm to be removed and replaced by another. Both projectors are moved simultaneously by a single lever mechanism, and suitable means are provided for positioning and holding the projectors in the two positions, as will be described in more detail. When these projectors are in operating position over the firearm, enlarged images of the front and rear sights are projected on their screens by light projecting systems, whereby the positions of such sights may be compared to correct positions determined by fixed reference points or calibrated images 200a and 201a of such sights on the screens. Brackets 79 are pivotally mounted on a horizontal shaft 80 (see Figs. 5 and 6) which is supported between two brackets 81 secured as by bolts 82 to each end of the right side of base 1 as viewed in Fig. 6. The projectors 20 and 21 are suitably fastened to brackets 79 respectively by four bolts 86 in the base of each projector (Fig. 20).

Figure 19:
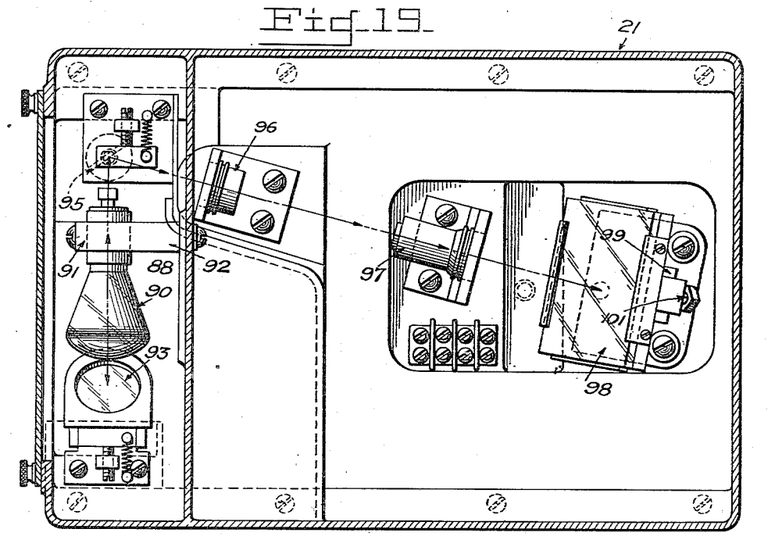
Fig. 19 is a view of the rear projector with the top broken away to show the arrangement of the illuminating source used for illuminating the rear sight of the rifle and the lenses and mirrors utilized for projecting the image of such sight onto the viewing screen.
Figure 20:
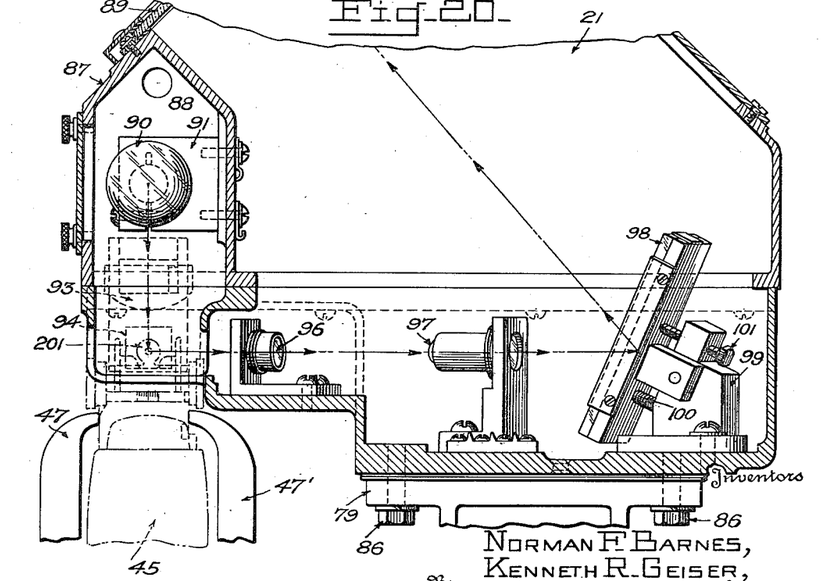
Fig. 20 is a view of the rear projector with the side removed to show a side elevational view of the optical arrangement.
Figure 21:
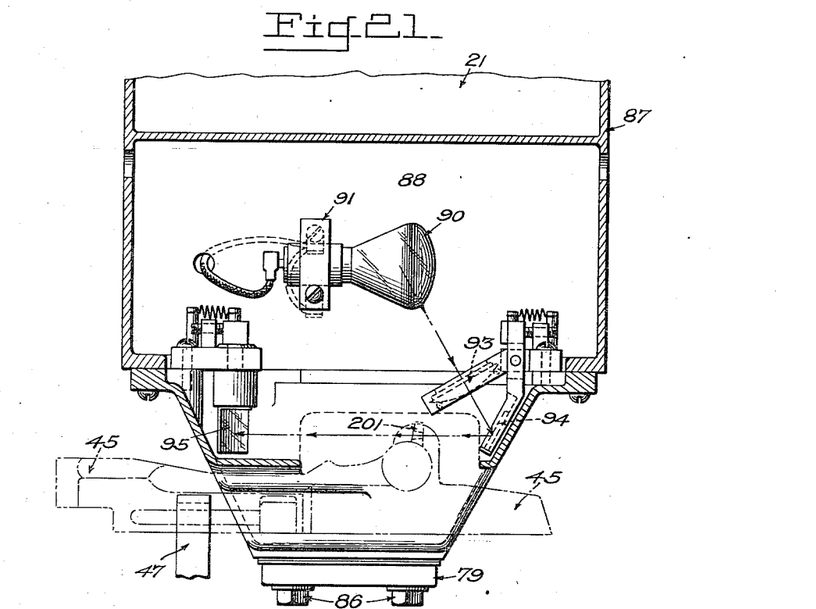
Fig. 21 is a fragmentary front elevational view of the rear projector with the front removed to show the light source and the arrangement of mirrors and lens utilized to project the light rays through the rear sight.

The details of the rear sight projector 21 are best shown in Figs. 19, 20, and 21. The projector 21 comprises a housing 87, a light source 88 and an optical arrangement whereby the shadow image of the rear sight of a firearm may be enlarged and projected upon a viewing screen 89. The housing 87 is a box suitably shaped so that when mounted on brackets 79 the housing can be moved to cover the rear sight of a firearm 45. The light source 88 is then mounted directly above the firearm adjacent the rear sight as shown in Fig. 21. The light source 88 comprises an electric bulb 90 which is screwed into a conventional receptacle 91 which in turn is mounted on a partition 92. Almost directly over the rear sight but slightly ahead of it there is mounted a condensing lens 93. The light beam produced by the condensing lens 93 is then directed to strike an inclined mirror 94 suitably mounted directly under condensing lens 93. The mirror reflects the light beam back past the rear sight 201 (Fig. 21) (assuming the projector has been moved to its proper position with respect to the sight by means to be described) and thence to a mirror 95 suitably mounted within the housing 87 somewhat ahead of the rear sight, thence thru two magnifying lenses 96 and 97 (Fig. 20) in alignment with another mirror 98. Mirror 98 is obliquely mounted within housing 87 so that the shadow of the rear sight of the firearm 45 may be projected onto a viewing screen 89.

Mirror 98 is pivotally mounted on a suitable bracket 99. A spring 100 is placed between mirror 98 and bracket 99 to bias the mirror 98 back against an adjustable stop 101 which is screwed into a suitably threaded hole in bracket 99. Then by turning screw 101 mirror 98 may be angularly adjusted to properly locate the image of the rear sight on viewing screen 89.

Figure 22:
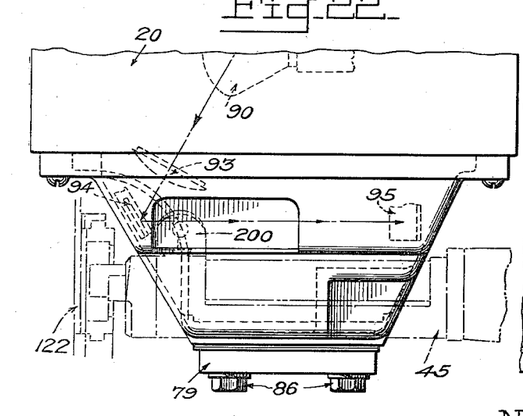
Fig. 22 is a view similar to that shown in Fig. 21 of the front projector for the front sight of the firearm.
Figure 23:
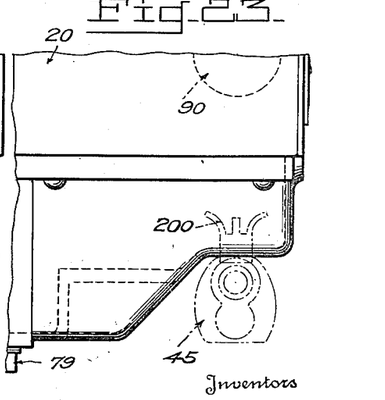
Fig. 23 is a fragmentary front elevational view of Fig. 22.
Figure 24:
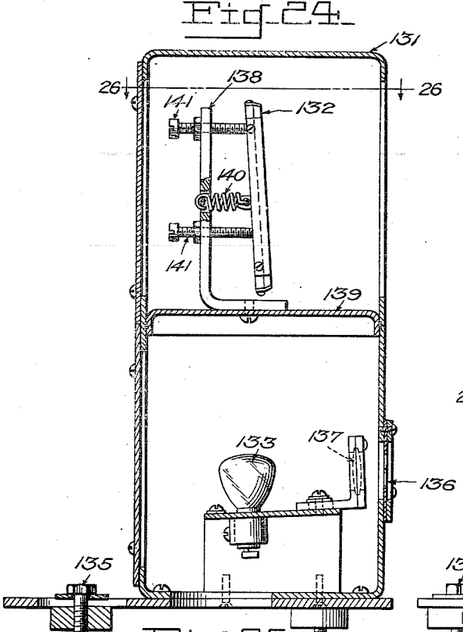
Fig. 24 is a view of the rifle positioning light source with the side removed showing the arrangement of the light source and reflecting mirror.
Figure 25:
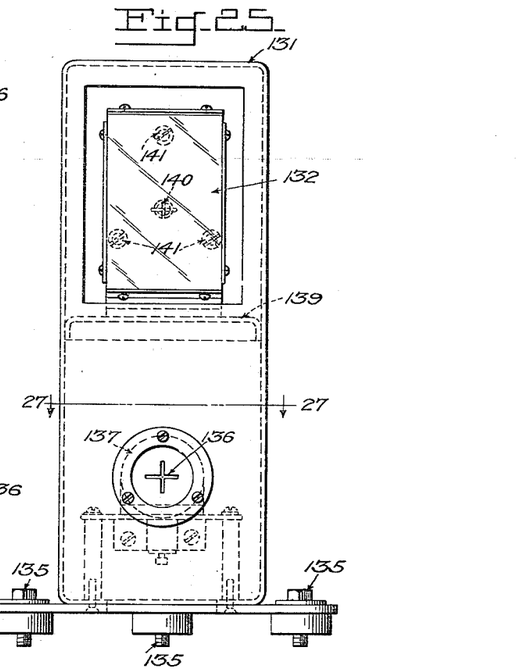
Fig. 25 is a right side elevational view of Fig. 24.
Figure 26:
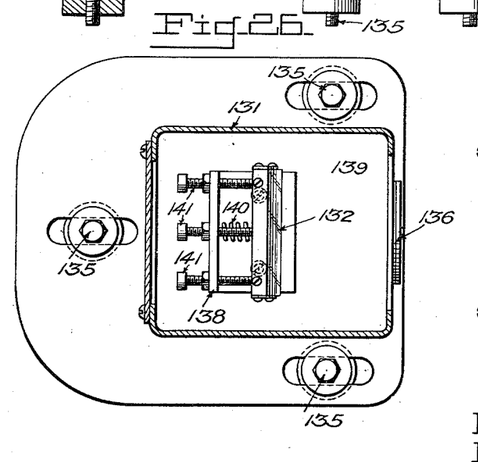
Fig. 26 is a cross sectional view taken along the plane 26—26 of Fig. 24.
Figure 27:
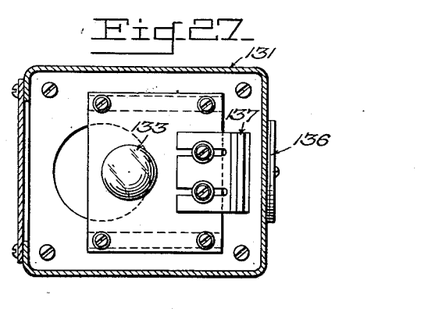
Fig. 27 is a cross sectional view taken along the plane 27—27 of Fig. 25.

The projector 20 for the front sight is of similar construction to projector 21 and is similarly mounted with respect to the front sight of firearm 45 (Figs. 22 and 23). The same optical and mirror arrangement is mounted within the housing of projector 20 to project a shadow of the front sight upon a corresponding viewing screen 89 similarly located on the housing of projector 20.

Figure 15:
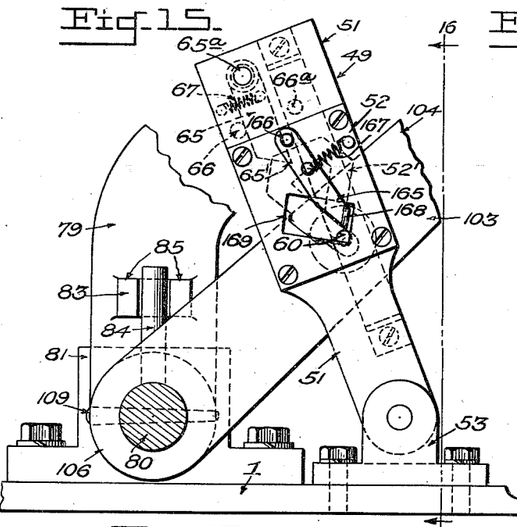
Fig. 15 is an enlarged detail view showing the lever stop plate and cam used for holding the projector raising levers in the raised position.
Figure 16:
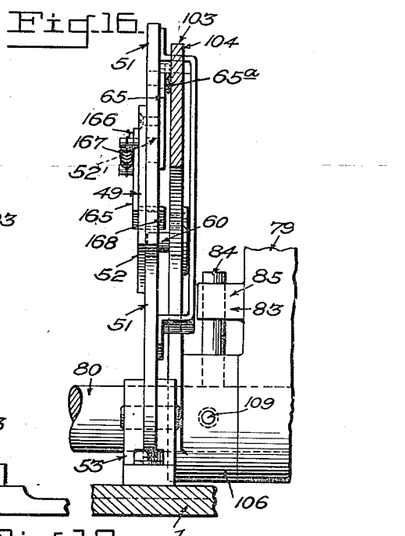
Fig. 16 is a sectional view taken along the plane 16—16 of Fig. 15.
Figures 17, 18:
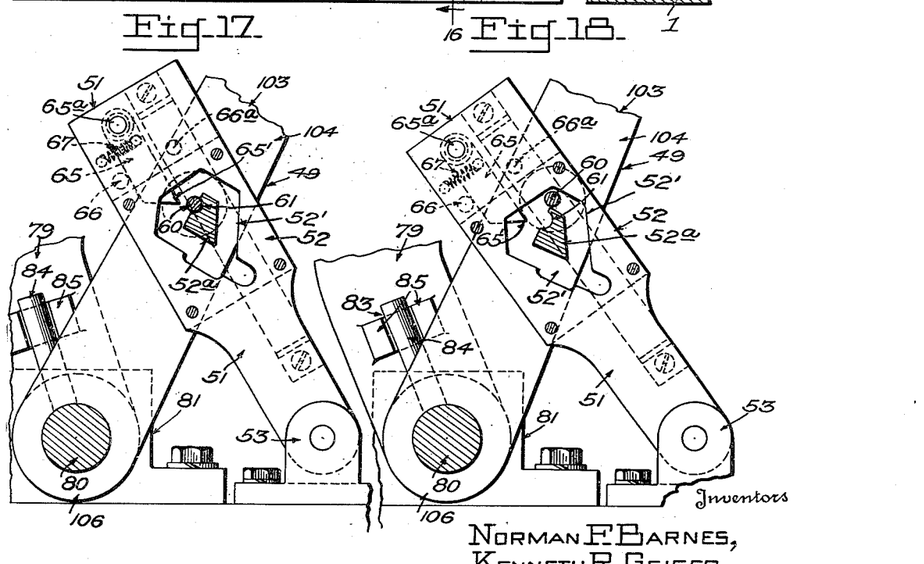
Fig. 17 is an enlarged detail view showing the stop plate supporting the lever arms in a raised position.
Fig. 18 is a view similar to Fig. 17 showing the lever arms disengaged from the cam in the supporting stop plate.

A lever 103 (Figs. 3 and 5), which comprises two spaced arms 104 and a connecting handle 105, is mounted on the horizontal shaft 80 to provide a pivotal motion for projectors 20 and 21 about shaft 80 to facilitate mounting and removal of a firearm from the clamp 44 and barrel chuck 74. A boss 106 (Figs. 15 to 18) on the end of each lever arm 104 is provided for mounting the lever on the shaft 80. A pin 84 is inserted in a suitable radial hole in each of the bosses 106. When lever 103 is placed on shaft 80 the pins 84 engage the arms 85 of a bifurcated integral lug 83 provided on each of the projector brackets 79. A set screw or pin 109 in each of the bosses 106 securely locks the lever 103 to the shaft 80. Thus when the lever 103 is raised or lowered the projectors 20 and 21 will be simultaneously rotated with lever 103. To limit the upward movement of projectors 20 and 21 and to hold the projectors in a raised position a stop 49 is provided. The stop 49 (Figs. 15, 16, 17, and 18) comprises a stop plate 51 pivotally mounted on the base 1 at 53 adjacent the inside of rear lever arm 104. The plate 51 has a cutout part forming the outer surface of a cam track 52'. The inner surface of the cam track is formed by an irregular diamond-shaped part 52a projecting from the inside of a plate 52, which plate is screwed to the outside of plate 51 opposite the cam opening. The projection 52a from plate 52 extends into the opening cut in plate 51 and the cam track 52' thus extends around such projecting part 52a and between it and the opening cut in plate 51. In Figs. 17 and 18 the plate 52 is removed and the projection 52a therefrom is shown in section. A stud 60 projecting from the side of lever arm 104 extends into the cam track 52' and when the lever 104 is in lowered position, the stud 60 is near the bottom of the cam track as shown in Fig. 15. When lever 104 is raised, stud 60 thereon follows up the left-hand side of the cam track and when lever 104 is lowered, stud 60 moves down the right-hand side of the cam track 52' as viewed in Figs. 15, 17, and 18. When the stud 60 is in the upper portion of the cam track 52', it may rest in a notch 61 in the upper face of projection 52a to hold lever 104 in raised position. A pair of pivoted, spring-urged levers 65 and 165 help to guide the stud 60 in the desired path of travel in such raising, locking and lowering operation of lever 104. Lever 165 shown only in Figs. 15 and 16 is pivoted on the outside of plate 52 at 166 and is urged in a counterclockwise direction by a spring 167. Its lower end has a wedge-shaped projection 168 which extends through an opening 169 in plate 52 into the lower portion of the cam track and serves to close the right-hand branch of the cam track as represented in Fig. 15, when lever 104 is raised and thus causes stud 60 to move up the left branch of such track. If lever 165 on its equivalent were not provided, the stud would move up the right-hand branch of the cam track since stop plate 51 is freely pivoted at 53 and tends to drop to the left by gravity. The projection 168 serves as its own stop against the side of the cam track when in the position shown in Fig. 15.

The lever 65 is pivoted at 65a to the inside of stop member 51 and is urged clockwise by a spring 67 against a stop 66. Another stop 66a limits movement of lever 65 in a counterclockwise direction. The lower end 65' of lever 65 is beveled and extends partially into the path of movement of stud 60 when in the upper portion of the cam track. When lever 104 is raised, stud 60 moving up the left branch of the cam track strikes the rear of the beveled surface 65' and forces lever 65 to move counterclockwise. Stud 60 cannot pass the projecting end 65' of such lever unless the stud drops into notch 61 and so in the upward movement of stud 60, lever 65 is first moved against stop 66a. This is as far as lever 104 can be raised at this time. When this limit is reached, the operator releases lever 104 and stud 60 drops into notch 61 and allows lever 65 to move clockwise past it and back against stop 66. This is the raised and latched position of the parts as represented in Fig. 17.

To unlatch and lower lever 104, the operator first raises the lever slightly to lift the stud from recess 61. Stop lever 51 now moves by gravity to the left, bringing the position of the parts to those represented in Fig. 18. The lever 104 is now released and stud 60 moves down the right-hand branch of the cam track, returning to the lowered lever position of Fig. 15. When the stud 60 reaches the projection 168 of lever 165, the lever is moved clockwise by such stud to allow the stud 60 to pass.

To cushion the downward movement of the projectors 20 and 21 a dash pot 102 (Figs. 6 and 7) is mounted underneath each of the brackets 79. The dash pots 102 are each pivotally secured at one end by a pin 111 to a bracket 110 located on fixed base 1. The opposite end of each dash pot 102 is pivotally secured to the underside of each bracket 79 by a pin 113 (Figs. 6 and 7) which is inserted thru suitable holes in a bifurcated lug at 114 provided on the underside of each bracket 79.

The downward movement of projectors 20 and 21 is arrested by a stop 112 (Fig. 6) threadably secured to the top of fixed base 1 directly under left hand bracket 79 as viewed in Fig. 3. A bolt 112' may be provided in the top of stop 112 for convenience in adjusting the height at which it is desired to have the projectors stop. The proper height is of course determined by the positioning of the sights in the path of the light beams in projectors 20 and 21.

A rifle bore positioning screen 115 is mounted on a pedestal 116 approximately in the center of base 1 and somewhat in back of firearm 45 as viewed in Fig. 3. The rifle positioning screen comprises a housing 117, a viewing screen 118 having a fixed reticle 136a marked thereon and a mirror 119 (Fig. 2). Housing 117 is essentially a rectangular sheet metal enclosure mounted on top of pedestal 116 which is a length of tubing. The bottom end of pedestal 116 is threaded into a flange which in turn is secured to base 1 by four bolts 120. Mirror 119 is mounted within housing 117 in such a manner that it will reflect light rays emanating from a rifle bore positioning light source (to be described) onto screen 118.

The rifle positioning light source comprises a housing 131 (Figs. 24, 25, 26, and 27), a mirror 132 and a light bulb 133. The housing 131 is preferably mounted on a vibration free poured concrete pier 134 which is located at some distance from the pier 2 preferably at least 10 feet, as indicated in Fig. 1. Housing 131 is substantially a rectangular sheet metal box and is secured to the top of pier 134 by bolts 135. A reticle aperture 136 is provided in the face of housing 131 and a light bulb 133 is mounted in a suitable receptacle directly in back of aperture 136. Between light bulb 133 and aperture 136 there is placed a condensing lens 137 for the purpose of intensifying the light rays emanating from the light bulb 133. Directly above the light bulb 133 a mirror 132 is mounted on a bracket 138. Bracket 138 is secured to a shelf 139 which is welded or otherwise secured to housing 131. A spring 140 suitably secured to the back of mirror 132 and to bracket 138 holds mirror 132 firmly against three adjusting screws 141 provided in bracket 138.

Figure 28:
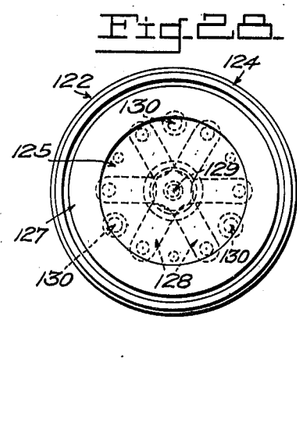
Fig. 28 is a front elevational view of the bore plug and concave mirror mounting.
Figure 29:
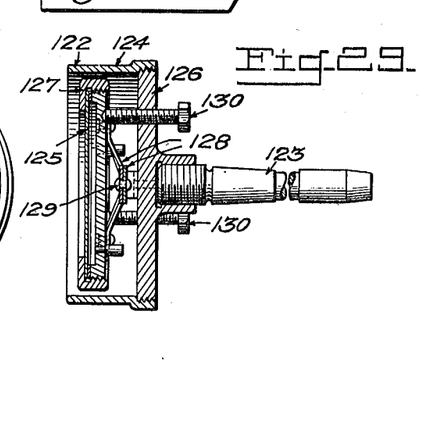
Fig. 29 is a longitudinal cross sectional view of the bore plug and concave mirror mounting.
Figure 30:
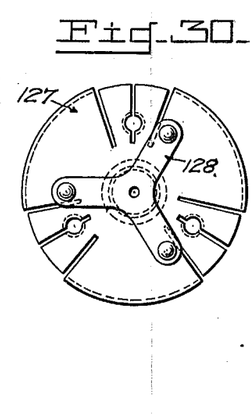
Fig. 30 is a detail view of the concave mirror holder and holder spring.

An optical bore plug and mirror mount 122, which comprises a plug portion 123, a cylindrical housing 124 and a concave mirror 125 (Figs. 28, 29, and 30), is inserted in the muzzle end of the barrel of a firearm 45 to reflect the light from the rifle positioning light source 121 to the rifle positioning screen 118 in a manner to be described in more detail later. The plug portion 123 is cylindrical, carefully machined to fit the rifle bore and having one end threaded into the hub of a flange 126. The cylindrical housing 124 is then screwed onto flange 126. The concave mirror 125 is mounted in a suitable holder 127 which in turn is fastened to two star-shaped springs 128. The springs 128 are secured together in the center of the flange 126 by a rivet 129, as shown in Fig. 29. Three mirror positioning screws 130 are screwed into suitably threaded holes in flange 126 and are brought to bear against the rear surface of the mirror holder 127. The optical axis of the mirror is adjusted to coincide with the axis of the plug so that when the plug is inserted into a rifle barrel, the mirror can be used to tell where the axis of the bore is pointing.

Prior to use the rifle targeting apparatus is calibrated with a standard rifle. The standard rifle should be a rifle that has been targeted satisfactorily at a desired range and the sights of which zero satisfactorily on both windage and elevation scales. To calibrate the apparatus with such a rifle the muzzle of the rifle is inserted in the barrel chuck of Fig. 8 and in the rear clamp 44 of Fig. 11. The barrel clamp is then tightened by releasing lever 75. The rear clamp 44 is tightened by pushing lever 48 down as far as it will go. The elevation and azimuth adjustments of the movable base 10 are set to a mean position by hand wheels 28 and 39. Prior to insertion of the firearm in the clamps the two projectors 20 and 21 had been rotated to a rearward position. The projectors are then brought over the front and rear sights by pushing lever 103 upward and releasing it. The dash pots 102 gently lower the projectors into position. The various light bulbs in the rifle positioning light source and the two projectors are of course illuminated. The light coming from bulb 133 passes thru the aperture 136 where it is picked up by the concave mirror 125. The image of the reticle aperture 136 is then reflected by the mirror 125 back to the mirror 132 in the rifle positioning light source 121. Mirror 132 reflects the light to mirror 119 which in turn reflects the image onto the viewing screen 118. The mirrors previously mentioned are then adjusted to bring the image of aperture 136 into the center of screen 118. Front and rear sight projectors 20 and 21 then pick up the image of the front and rear sights respectively and project such images up to the screens 89 of projectors 20 and 21 respectively. The light rays on the rear sight projector from light bulb 90 are intensified by condensing lens 93 and coming thru lens 93 the light rays strike mirror 94 which are reflected to the rear sight thus strongly illuminating the rear sight. Lens 96 projects the image of the rear sight thru lens 97 and onto mirror 98. Mirror 98 then reflects the shadow image of the rear sight to viewing screen 89. The shadow image of the front sight is similarly projected onto the viewing screen in projector 20. The mirror 98 in projector 21 is then adjusted to bring the shadow image of the rear sight into the center of viewing screen 89. The mirror in projector 20 is likewise adjusted.

These calibrated positions of the front and rear sight images on screens 89 are indicated by marking or engraving such portions of screens 89. Such markings on the screens are indicated at 200a and 201a and will for convenience be referred to as "calibrated images." With the targeting apparatus calibrated as above described, the apparatus is now ready to be used for targeting firearms, for adjusting the sights on such firearms with respect to the bore without the necessity for actually firing the firearms.

A rifle not previously sighted in or targeted is placed in the targeting apparatus in the same manner as described for mounting a standard rifle for calibration purposes. The mirror and bore plug is of course inserted in the muzzle end of the firearm barrel. The image of aperture 136 picked up by the bore plug mirror and relayed to the rifle positioning screen 118 is brought into juxtaposition with the fixed recticle 131a centrally located on the screen 118 by adjustment of elevation and azimuth hand wheels 28 and 39. The bore of the firearm now being sighted in is in exact alignment with that of the standard rifle which is used to calibrate the apparatus. Hence the firearm can be said to be in the "zero" position with respect to the "calibrated images" on screens 89. It is now necessary to bring the image of the rear sight 201 into the juxtaposition with the calibrated image 201a on the viewing screen of projector 21, and the image of the front sight 200 into juxtaposition with the calibrated image 200a on the screen of projector 20, as determined by the standard rifle. This is conveniently accomplished by individual manual adjustment of the sights of the firearm, using the customary horizontal and vertical adjustments provided on such sights. When the sights are adjusted so that the images are in juxtaposition with the calibrated images on the viewing screens the sights are in alignment with the bore of the rifle and hence in their zero position. Defects either in straightness of the barrel bore or position of the sights on the rifle can be readily detected by this apparatus by the failure of a limited adjustment of the elevation or windage settings of the sights to align the images on the viewing screens with the calibrated images.

We claim:
1. In an apparatus for targeting firearms having adjustable front and rear sights, an adjustable position support arranged to receive successive firearms, a light source producing a light beam, a concave mirror arranged to be mounted on the supported firearm with the mirror axis coincident with the axis of the muzzle end of the bore of the supported firearm, a first calibrated screen, said mirror being arranged to reflect said light beam, said reflected light beam being incident on said first calibrated screen, said first screen having a zero position indication thereon, whereby successive firearms may be identically positioned relative to said first calibrated screen, a front sight projector comprising means arranged to produce an image of the front sight of the supported firearm and including a second calibrated screen, having a fixed position relative to said first calibrated screen, on which the front sight image is projected, and a rear sight projector comprising means arranged to produce an image of the rear sight of the supported firearm and including a third calibrated screen, having a fixed position relative to said first calibrated screen, on which the rear sight image is projected, said second and third calibrated screens having zero sight position indications thereon determined by a correctly targeted firearm, whereby the front and rear sights of the supported firearm may be adjusted to correspond to the sight positions of a correctly targeted firearm.

2. In an apparatus for targeting firearms having adjustable front and rear sights, a fixed base, a movable base pivotally mounted on said fixed base for both horizontal and vertical movement with respect to said fixed base, means for positioning said movable base with respect to said fixed base, means arranged to support successive firearms on said movable base, a light source producing a light beam, a concave mirror arranged to be mounted on the supported firearm with the mirror axis coincident with the axis of the muzzle end of the bore of the supported firearm, a first calibrated screen, said mirror being arranged to reflect said light beam, said reflected light beam being incident on said first calibrated screen, said first screen having zero position indications thereon, whereby each successive firearm may be identically positioned relative to said first screen, a front sight projector comprising means arranged to produce an image of the front sight of the supported firearm and including a second calibrated screen, having a fixed position relative to said first calibrated screen, on which the front sight image is projected, and a rear sight projector comprising means arranged to produce an image of the rear sight of the supported firearm and including a third calibrated screen, having a fixed position relative to said first calibrated screen, on which the rear sight image is projected, said second and third calibrated screens having zero sight position indications thereon determined by a correctly targeted firearm, whereby the front and rear sights of the supported firearm may be adjusted to correspond to the sight positions of a correctly targeted firearm.

3. In an apparatus for targeting a firearm having adjustable front and rear sights, a fixed base, a support adjustably mounted on said fixed base and arranged to receive a firearm, a light source producing a light beam, a concave mirror arranged to be mounted on the supported firearm with the mirror axis coincident with the axis of the muzzle end of the bore of the supported firearm, a first calibrated screen, said mirror being arranged to reflect said light beam, said reflected light beam being incident on said first calibrated screen, said first screen having zero position indications thereon, whereby each successive firearm may be identically positioned relative to said first screen, a front sight projector comprising means arranged to produce an image of the front sight of the supported firearm and including a second calibrated screen, having a fixed position relative to said first calibrated screen, on which the front sight image is projected, a rear sight projector comprising means arranged to produce an image of the rear sight of the supported firearm and including a third calibrated screen, having a fixed position relative to said first calibrated screen, on which the rear sight image is projected, said second and third calibrated screens having zero sight position indications determined by a correctly targeted firearm, whereby the front and rear sights of the supported firearm may be adjusted to correspond to the sight positions of a correctly targeted firearm, said front sight projector and said rear sight projector being pivotally mounted on said fixed base on a common bracket whereby said projectors may be simultaneously pivoted into their said fixed positions, and a stop engaging said bracket to locate said projectors with respect to the sights of the supported firearm.

4. In an apparatus for targeting a firearm having adjustable front and rear sights, a fixed base, a movable base pivotally mounted on said fixed base for both horizontal and vertical movement with respect to said fixed base, means for positioning said movable base with respect to said fixed base, means arranged to support successive firearms on said movable base, a light source producing a light beam, a concave mirror arranged to be mounted on the supported firearm with the mirror axis coincident with the axis of the muzzle end of the bore of the supported firearm, a first calibrated screen, said mirror being arranged to reflect said light beam, said reflected light beam being incident on said first calibrated screen, said first screen having zero position indications thereon, whereby each successive firearm may be identically positioned relative to said first screen, a front sight projector comprising means arranged to produce an image of the front sight of the supported firearm including a second calibrated screen, having a fixed position relative to said first calibrated screen, on which the front sight image is projected, a rear sight projector comprising means arranged to produce an image of the rear sight of the supported firearm including a third calibrated screen, having a fixed position relative to said first calibrated screen, on which the rear sight image is projected, said second and third calibrated screens having zero sight position indications determined by a correctly targeted firearm, whereby the front and rear sights of the supported firearm may be adjusted to correspond to the sight positions of a correctly targeted firearm, said front sight projector and said rear sight projector being pivotally mounted on said fixed base on a common bracket whereby said projectors may be simultaneously pivoted into their said fixed position, and a stop engaging said bracket to locate said projectors with respect to the sights of the supported firearm.

5. A method of targeting a firearm having adjustable front and rear sights, comprising projecting an image of the front sight on a first calibrated screen, projecting an image of the rear sight on a second calibrated screen, positioning the firearm in a zero position with respect to said calibrated screens and then adjusting the sights so that the respective images thereof are aligned with the zero positions of the calibrated screens.

6. A method of targeting a firearm having adjustable front and rear sights, comprising projecting an image of the front sight on a first calibrated screen, projecting an image of the rear sight on a second calibrated screen, optically positioning the firearm in a zero position with respect to said calibrated screens and then adjusting the sights so that the respective images thereof are aligned with the zero positions of the calibrated screens.

7. An apparatus for adjusting the front and rear sights of a firearm relative to the axis of the firearm bore comprising, an adjustable firearm supporting means, a bore axis indicating reflecting means and screen means forming a first optical projection means for indicating the position of the axis of the muzzle end of the firearm bore, a second and a third projection means for projecting images of the front and rear sight upon respective screen means, and zero reference means on the screen of the three projection means to indicate a zero position, said zero reference means being determined by the corresponding projections of the bore axis, front sight and rear sight of a correctly targeted firearm, whereby the sights of the firearm under test may be adjusted until the said projection means indicate alignment of the projected images of the sights with the respective zero positions.

8. An apparatus for targeting firearms having an adjustable sight comprising a fixed base, a support movably mounted on said base and arranged to receive successive firearms, means for indicating the barrel bore position of a supported firearm relative to said base, means for adjusting the position of said support to position each successive firearm with the barrel bores in identical location relative to said base, a calibrated screen having a fixed position relative to said base, and projection apparatus for projecting an image of the adjustable sight of the supported firearm on said calibrated screen whereby the adjustable sight may be positioned in accordance with said calibrated screen to a zero position aligned with the barrel bore.

9. In an apparatus for targeting a firearm, a support arranged to receive a firearm, means for adjusting the position of the supported firearm and means for indicating the position of the axis of the muzzle end of the supported firearm barrel with reference to a zero position indication, said last mentioned means comprising a light source producing a light beam, a reticle aperture traversed by said light beam, a concave mirror disposed in the path of said light beam, said mirror being arranged to be mounted on the supported firearm with the mirror axis coincident with the axis of the muzzle end of the bore of the supported firearm, a screen arranged to receive the beam reflected by said mirror, and zero position indicating marks on said screen whereby successive firearms may be identically aligned with respect to said light beam.

10. In an apparatus for targeting a firearm, a fixed base, a movable base pivotally mounted on said fixed base for both horizontal and vertical movement with respect to said fixed base, means for positioning said movable base with respect to said fixed base, means for supporting a firearm on said movable base, means for indicating the position of the axis of the muzzle end of the bore of a supported firearm, said last mentioned means comprising a light source producing a light beam, a reticle aperture traversed by said light beam, a concave mirror arranged in the path of said light beam, said mirror being mounted on said firearm with the mirror axis coincident with the axis of the muzzle end of the bore of the firearm, a screen arranged to receive the beam reflected by said mirror, and indicating marks on said screen whereby successive firearms may be identically aligned with respect to said light beam.

11. In an apparatus for targeting a firearm having an adjustable sight, a fixed base, a gimbal pivotally mounted on said base for movement about a vertical axis, a movable base pivotally supported on the arms of said gimbal for movement about a horizontal axis, screw means operative between said fixed base and said movable base to position said movable base with respect to said fixed base, a chuck gimbal-mounted to said fixed base for movement about the horizontal and vertical axes of movement of said movable base, said chuck being arranged to support the muzzle end of successive firearms, a clamp mounted on said movable base, said clamp being arranged to engage a fixed point on the rear of the supported firearm, means for indicating the barrel bore position of the supported firearm relative to said fixed base, means for adjusting the position of said movable base to position each successive firearm with the barrel bores in identical location relative to said fixed base, a calibrated screen having a fixed position relative to said fixed base, and projection apparatus for projecting an image of the adjustable sight of the supported firearm on said calibrated screen, whereby the adjustable sight may be positioned in accordance with said calibrated screen to a zero position aligned with the barrel bore.

12. In an apparatus for targeting a firearm having adjustable front and rear sights, a fixed base, a gimbal pivotally mounted on said base for movement about a vertical axis, a movable base pivotally supported on the arms of said gimbal for movement about a horizontal axis, screw means operative between said fixed base and said movable base to position said movable base with respect to said fixed base, a chuck gimbal-mounted to said fixed base for movement about the horizontal and vertical axes of movement of said movable base, said chuck being arranged to support the muzzle end of successive firearms, a clamp mounted on said movable base, said clamp being arranged to engage a fixed point on the rear of the firearm, a light source producing a light beam, a concave mirror arranged to be mounted on the firearm with the mirror axis coincident with the axis of the muzzle end of the bore of the supported firearm, a first calibrated screen, said mirror being arranged to reflect said light beam, said reflected light beam being incident on said first calibrated screen, said first screen having zero position indications thereon, whereby each successive firearm may be identically positioned relative to said first screen, a front sight projector comprising means arranged to produce an image of the front sight of the supported firearm and including a second calibrated screen, having a fixed position relative to said first calibrated screen, on which the front sight image is projected, and a rear sight projector comprising means arranged to produce an image of the rear sight of the supported firearm and including a third calibrated screen, having a fixed position relative to said first calibrated screen, on which the rear sight image is projected, said second and third calibrated screens having zero sight position indications thereon determined by a correctly targeted firearm, whereby the front and rear sights of the supported firearm may be adjusted to correspond to the sight positions of a correctly targeted firearm.

13. An apparatus for targeting firearms having an adjustable sight comprising a fixed base, a support adjustably mounted on said base and arranged to receive successive firearms, a light source producing a light beam, a concave mirror arranged to be mounted on the supported firearm with the mirror axis coincident with the axis of the muzzle end of the bore of the supported firearm, a first calibrated screen, said mirror being arranged to reflect said light beam, said reflected light beam being incident on said first calibrated screen, whereby said support may be adjusted to position each successive supported firearm with the barrel bores in identical location relative to said first calibrated screen, a second calibrated screen having a fixed position relative to said first screen, and projection apparatus for projecting an image of the firearm adjustable sight on said second calibrated screen, whereby the adjustable sight may be positioned in accordance with said second calibrated screen to a zero position aligned with the barrel bore.

NORMAN FRANKLIN BARNES.
KENNETH RAYMOND GEISER.